US012539138B2

(12) United States Patent
Huber et al.

(10) Patent No.: US 12,539,138 B2
(45) Date of Patent: Feb. 3, 2026

(54) SYSTEMS AND METHODS FOR NAVIGATING, OPENING AND CLEANING PLAQUE OR TOTAL OCCLUSION IN ARTERIES

(71) Applicant: PRC CARDIO-OPTIC, Haifa (IL)

(72) Inventors: Arie Huber, Haifa (IL); Danny Rittman, San Diego, CA (US)

(73) Assignee: PRC CARDIO-OPTIC, Haifa (IL)

( * ) Notice: Subject to any disclaimer, the term of this patent is extended or adjusted under 35 U.S.C. 154(b) by 817 days.

(21) Appl. No.: 16/490,618

(22) PCT Filed: Sep. 18, 2017

(86) PCT No.: PCT/IB2017/055619
§ 371 (c)(1),
(2) Date: Sep. 3, 2019

(87) PCT Pub. No.: WO2018/167547
PCT Pub. Date: Sep. 20, 2018

(65) Prior Publication Data
US 2020/0000488 A1 Jan. 2, 2020

Related U.S. Application Data

(60) Provisional application No. 62/470,908, filed on Mar. 14, 2017.

(51) Int. Cl.
*A61B 5/00* (2006.01)
*A61B 5/02* (2006.01)
(Continued)

(52) U.S. Cl.
CPC .... *A61B 17/320758* (2013.01); *A61B 5/0036* (2018.08); *A61B 5/0095* (2013.01);
(Continued)

(58) Field of Classification Search
CPC ............ G16H 30/40; A61B 17/320758; A61B 5/0036; A61B 5/0095; A61B 5/02007;
(Continued)

(56) References Cited

U.S. PATENT DOCUMENTS 4,601,705 A * 7/1986 McCoy ............. A61M 25/0158
600/434
5,372,138 A * 12/1994 Crowley ................ A61B 5/416
600/463
(Continued)

OTHER PUBLICATIONS

Wygant et al., Photoacoustic Imaging Using a Two-Dimensional CMUT Array, 2005 IEEE (Year: 2005).*
(Continued)

*Primary Examiner* — Pascal M Bui Pho
*Assistant Examiner* — Gabriel Victor Popescu
(74) *Attorney, Agent, or Firm* — The Law Office of Joseph L. Felber

(57) ABSTRACT

A vascular guide wire device comprising: a guide wire comprising a guide wire head and a laser-acoustic head sensor configured to navigate in a patient's blood vessel, said laser-acoustic head sensor connected via an optic fiber threaded through said guide wire device with a laser-acoustic diode controlled by a laser-acoustic diode controller; a computerized system electronically communicating with said laser-acoustic head sensor, said computerized system comprising a computer, image processing means and display means and configured to provide images and measurements 2-centimeters ahead inside a patient's arteries occlusions therein purposing to move and navigate safely into the right artery lumen; first steering means connected with said guide wire head and configured to navigate said laser-acoustic head sensor according to said image processing results; and opening means connected with said guide wire head for opening total occlusion of said artery.

11 Claims, 10 Drawing Sheets

(51) Int. Cl.
*A61B 17/22* (2006.01)
*A61B 17/3207* (2006.01)
*A61B 17/00* (2006.01)

(52) U.S. Cl.
CPC ........ *A61B 5/02007* (2013.01); *A61B 5/6851* (2013.01); *A61B 17/22031* (2013.01); *A61B 5/0013* (2013.01); *A61B 2017/003* (2013.01); *A61B 2017/00309* (2013.01); *A61B 2017/00535* (2013.01); *A61B 2017/22081* (2013.01); *A61B 2017/22094* (2013.01); *A61B 2576/00* (2013.01)

(58) Field of Classification Search
CPC ............ A61B 5/6851; A61B 17/22031; A61B 5/0013; A61B 2017/003; A61B 2017/00309; A61B 2017/00535; A61B 2017/22081; A61B 2017/22094
See application file for complete search history.

(56) References Cited

U.S. PATENT DOCUMENTS

| | | | | |
|---|---|---|---|---|
| 8,709,034 | B2* | 4/2014 | Keast | A61B 17/3478 606/185 |
| 9,364,167 | B2* | 6/2016 | Vertikov | A61B 5/062 |
| 2010/0280316 | A1* | 11/2010 | Dietz | A61B 17/3478 600/109 |
| 2010/0286708 | A1* | 11/2010 | Rittman | A61B 17/3207 606/127 |
| 2011/0093007 | A1* | 4/2011 | Abbott | A61B 17/0644 600/213 |
| 2011/0301458 | A1 | 12/2011 | Li et al. | |
| 2012/0035540 | A1* | 2/2012 | Ferrem | A61B 5/076 604/95.01 |
| 2013/0150716 | A1* | 6/2013 | Stigall | A61B 8/12 600/439 |
| 2014/0180316 | A1* | 6/2014 | Hoseit | A61B 17/32078 606/159 |
| 2014/0194704 | A1* | 7/2014 | Millett | A61B 5/686 600/301 |
| 2014/0276015 | A1* | 9/2014 | Whiseant | A61B 2017/220 600/425 |
| 2015/0105809 | A1* | 4/2015 | Connolly | A61B 2017/003 606/159 |
| 2015/0196309 | A1* | 7/2015 | Matsubara | A61B 5/0095 606/127 |
| 2016/0287278 | A1* | 10/2016 | Sigal | A61B 5/0095 |

OTHER PUBLICATIONS

International Search Report in PCT/IB2017/055619 dated Dec. 25, 2017.

Rosenthal et al., "Intravascular multispectral optoacoustic tomography of atherosclerosis: prospects and challenges", Imagining in Medicine 4.3 (2012) 229, retrieved from the Internet at URL: <https://www.ncbi.nlm.nih.gov/pmc/articles/OMC3493570/> Jun. 30, 2012.

* cited by examiner

ROUND PIN FILE
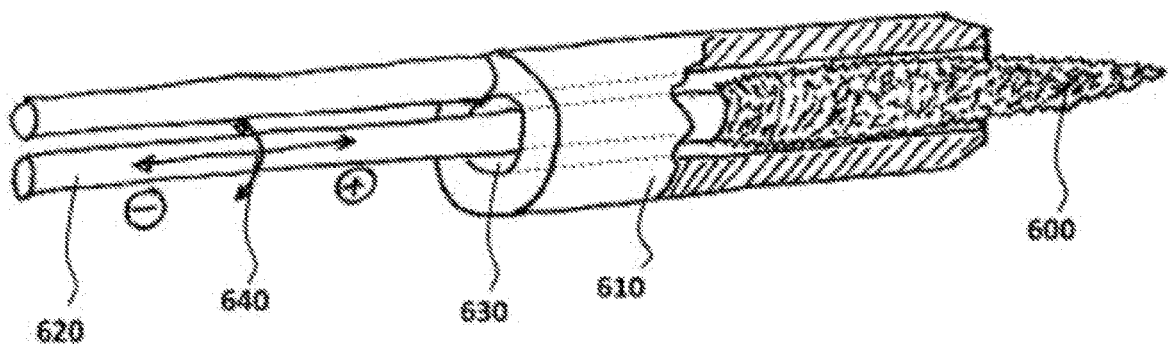
FIG. 6A
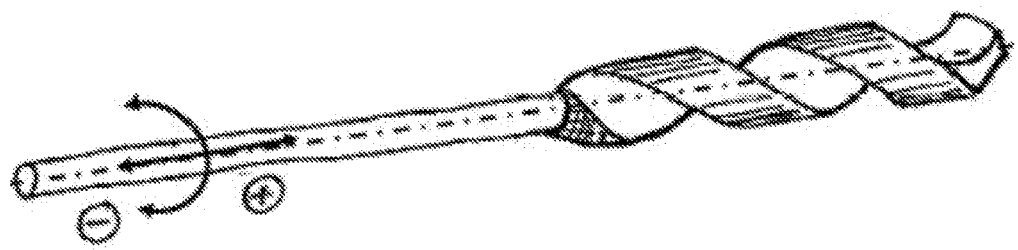
FIG. 6B
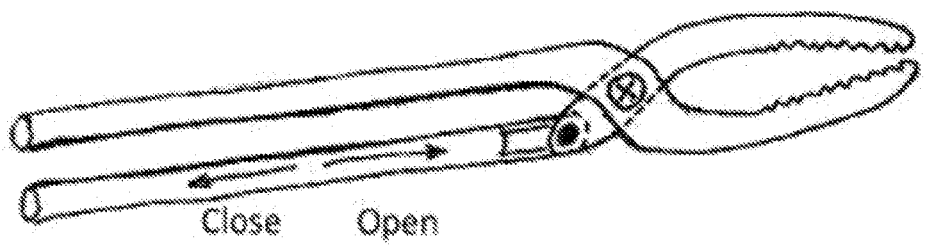
FIG. 6C
FIG. 6

SYSTEMS AND METHODS FOR NAVIGATING, OPENING AND CLEANING PLAQUE OR TOTAL OCCLUSION IN ARTERIES

CROSS-REFERENCE TO RELATED PATENT APPLICATIONS

This patent application claims priority from and is related to U.S. Provisional Patent Application Ser. No. 62/470,908, filed on 14 Mar. 2017, this U.S. Provisional Patent Application incorporated by reference in its entirety herein.

TECHNICAL FIELD OF THE INVENTION

The present invention relates generally to the field of vascular occlusion and therapies. More particularly, the invention relates to a device for safely navigating, cleaning and crossing total occlusion in arteries.

BACKGROUND

Heart disease, specifically coronary artery disease (CAD), is a major cause of death, disability, and healthcare expense. Until recently, most heart diseases were considered to be primarily the result of a progressive increase of hard plaque in the coronary arteries. This atherosclerotic disease process of hard plaques leads to a critical narrowing (stenosis) of the affected coronary artery and produces anginal syndromes, known commonly as chest pain. The progression of the narrowing or artery total occlusion reduces blood flow, triggering the formation of a blood clot. The clot may choke off the flow of oxygen rich blood (ischemia) to heart muscles, causing a heart attack. Alternatively, the clot may break off and lodge in another organ vessel such as the brain, resulting in a thrombotic stroke.

Within the past decade, evidence has emerged expanding the paradigm of atherosclerosis, coronary artery disease, and heart attacks. While the buildup of hard plaque may produce angina and severe ischemia in the coronary arteries, new clinical data now suggests that the rupture of sometimes non-occlusive, vulnerable plaques causes the vast majority of heart attacks. The rate is estimated at as high as 60-80 percent. In many instances vulnerable plaques do not impinge on the vessel lumen, rather, much like an abscess they are ingrained under the arterial wall. For this reason, conventional angiography or fluoroscopy techniques are unlikely to detect the vulnerable plaque. Due to the difficulty associated with their detection and because angina is not typically produced, vulnerable plaques may be more dangerous than other plaques that cause pain.

Atherosclerotic plaques vulnerable to rupture are typically small deposits covered by thin fibrous caps (less than 70 microns) covering lipid cores. Within the fibrous cap is a dense infiltrate of smooth muscle cells, macrophages and lymphocytes. The lipid pool is believed to be formed as a result of a pathological process involving low density lipoprotein (LDL), macrophages, and the inflammatory process. The macrophages oxidize the LDL producing foam cells. The macrophages, foam cells, and smooth muscle cells sit beneath the endothelium and release various toxic substances, such as tumor necrosis factor and tissue factor. These substances damage the arterial wall and surrounding areas and can result in generalized cell necrosis and apoptosis, pro-coagulation, and weakening of the fibrous cap. The inflammation process may weaken the fibrous cap to the extent that sufficient mechanical stress, such as that produced by increased blood pressure, may result in rupture. The lipid core and other contents of the vulnerable plaque (emboli) may then spill into the blood stream thereby initiating a clotting cascade. The cascade produces a blood clot (thrombosis) that potentially results in a heart attack and/or stroke. The process is exacerbated due to the release of collagen and other plaque components (e.g., tissue factor), which enhance clotting upon their release.

Several strategies have been developed for the detection (e.g., diagnosis and localization) of vulnerable plaques. One strategy involves the measurement of temperature within a blood vessel. For example, vulnerable plaque tissue temperature is generally elevated compared to healthy vascular tissue. Measurement of this temperature discrepancy may allow detection of the vulnerable plaque.

Another detection strategy involves labeling vulnerable plaque with a marker. The marker substance may be specific for a component and/or characteristic of the vulnerable plaque. For example, the marker may have an affinity for the vulnerable plaque, more so than for healthy tissue. Detection of the marker may thus allow detection of the vulnerable plaque. Alternatively, the marker may not necessarily have an affinity for the vulnerable plaque, but will simply change properties while associated with the vulnerable plaque. The property change may be detected and thus allow detection of the vulnerable plaque.

Regardless of the strategy used for detection, a formidable problem remains in the treatment of the vulnerable plaque. Without appropriate treatment, the vulnerable plaque may rupture and subsequently release embolic material and cause great risk to the patient. Drug and other therapies exist that may reduce the size and chance of vulnerable plaque rupture over a relatively long time frame. These therapies, however, may not be desirable or effective for all patients, including those having vulnerable plaques on the immediate verge of rupture. With such therapies, accidental or unanticipated rupture of these truly vulnerable plaques may occur in a non-clinical setting.

Therefore, it would be desirable to provide a system that would enable the safe removal of vulnerable and hard plaque such as Coronary or other peripheral artery Total Occlusion.

It may be also desirable for such a system to periodically check for any potential embolic material from escaping a ruptured vulnerable plaque and causing risk to the patient.

SUMMARY

According to a first aspect of the present invention there is provided a vascular guide wire device comprising: a guide wire comprising a guide wire head and a laser-acoustic head sensor configured to navigate in a patient's blood vessel, said laser-acoustic head sensor connected via an optic fiber threaded through said guide wire device with a laser-acoustic diode controlled by a laser-acoustic diode controller; a computerized system electronically communicating with said laser-acoustic head sensor, said computerized system comprising a computer, image processing means and display means and configured to provide images and measurements 2-5 centimeters ahead inside a patient's arteries occlusions therein purposing to move and navigate safely into the right artery lumen; first steering means connected with said guide wire head and configured to navigate said laser-acoustic head sensor according to said image processing results; and opening means connected with said guide wire head for opening total occlusion of said artery.

The connection of said optic fiber with said laser diode may be wireless.

The first steering means may comprise means for changing direction of said laser acoustic head sensor to correct deviations from the desired path through the occlusion.

The first steering means may comprise two super elastic thin wires that are connected to the laser-acoustic head sensor, said thin wires configured to change the direction of the guide wire head upon being pulled from outside of the patient's body.

The guide wire head may be configured to swivel, wherein the first steering means may comprise tiny arms connected to said swiveling head, each one of said tiny arms connected to a respective one of said super elastic thin wires.

The first steering means may comprise an elastic guide wire connected on a first end thereof to an external control knob and on a second end thereof to the guide wire head; and flexible joints comprising metal balls spanning said elastic guide wire.

The first steering means may comprise a pneumatic or hydraulic micro actuator.

The opening means may comprise at least one micromechanical tool navigated by second steering means.

The opening means may comprise low power laser-acoustic configured to melt an occlusion cap.

The opening means may comprise one of: radiofrequency, ultrasound and blunt micro dissection.

The imaging system is configured to distinguish a true luminal path (dissection) from one created through the vessel wall (perforation) of an occluded segment, including imaging ahead and on sides of the walls.

The imaging system may be configured to differentiating between material types.

The imaging system may be configured to provide continuous measurement information about the laser-acoustic head sensor's distances from the vessel wall.

The laser-acoustic head sensor and the imaging system is configured to provide live vision ahead into the occluded artery.

The live vision ahead may comprise imaging 2-5 centimeters of the artery on said display.

The imaging means comprise 3-dimensional image processing means.

The image processing means comprise means for identifying occlusion or plaque material type.

The image processing means may comprise means for automated and continuous measurement of the guide wire head distance from the vessel's wall.

The vascular guide wire may have a diameter of 1 millimeter up to 3 millimeter.

The laser-acoustic head sensor and the opening means may be built using MEMS (MicroElectroMechanical Systems) technology.

The vascular guide wire device may further comprise energy management means configured to provide pre-panning of the laser acoustic pulse rates.

The computer may be electronically connected with said laser diode controller.

The computer may control the frequency of said laser diode pulses according to said identifying occlusion or plaque material type.

The computer may control the frequency of said laser diode pulses according to said measured guide wire head distance from the vessel's wall.

According to a second aspect of the present invention there is provided a method of blood vessels scanning and cleaning, comprising: inserting a guide wire comprising a guide wire head and a laser-acoustic head sensor connected with a laser diode into a patient's blood vessel, said laser-acoustic head sensor connected via an optic fiber threaded through said guide wire device with a laser diode controlled by a laser diode controller; continuously communicating said laser-acoustic sensor's signals to a computer system comprising a computer, image processing means and display means and providing images and measurements 2-5 centimeters ahead inside a patient's arteries occlusions therein purposing to move and navigate safely into the right artery lumen; navigating said guide wire in said patient's blood vessel according to said image processing results using first steering means; and opening total occlusion of said blood vessel.

The connection of said optic fiber with said laser diode may be wireless.

The navigating may comprise changing direction of said laser acoustic head sensor to correct deviations from the desired path through the occlusion.

The first steering means may comprise two super elastic thin wires that are connected to the laser-acoustic head sensor, and wherein changing the direction of said laser acoustic head sensor comprises pulling said thin wires from outside of the patient's body.

The guide wire head may be configured to swivel and said first steering means may comprise tiny arms connected to said swiveling head, each one of said tiny arms connected to a respective one of said super elastic thin wires.

The first steering means may comprise an elastic guide wire connected on a first end thereof to an external control knob and on a second end thereof to the guide wire head; and flexible joints comprising metal balls spanning said elastic guide wire.

The first steering means may comprise a pneumatic or hydraulic micro actuator.

The opening may comprise using at least one micromechanical tool navigated by second steering means.

The opening may comprise melting an occlusion cap using low power laser-acoustic.

The opening may comprise using one of: radiofrequency, ultrasound and blunt micro dissection.

The image processing comprises distinguish a true luminal path (dissection) from one created through the vessel wall (perforation) of an occluded segment, including imaging ahead and on sides of the walls.

The image processing may comprise differentiating between material types.

The imaging system may provide continuous measurement information about the laser-acoustic head sensor's distances from the vessel wall.

The laser-acoustic head sensor and the imaging system may provide live vision ahead into the occluded artery.

The live vision ahead may comprise imaging 2-5 centimeters of the artery on said display.

The image processing provides 3-dimensional images.

The image processing may comprise identifying occlusion or plaque material type.

The image processing may provide automated and continuous measurement of the guide wire head distance from the vessel's wall.

The method may further comprise controlling said laser-acoustic head sensor diode according to said identifying occlusion or plaque material type.

The controlling may comprise controlling the frequency of said laser diode pulses according to said measured guide wire head distance from the vessel's wall.

According to a third aspect of the present invention there is provided a system for detecting and opening total occlusion in blood vessels, comprising: a first guide wire comprising a first guide wire head and a laser-acoustic head sensor configured to navigate in a patient's blood vessel, said laser-acoustic head sensor connected via an optic fiber threaded through said guide wire device with a laser diode controlled by a laser diode controller; a computerized system electronically communicating with said laser-acoustic head sensor, said computerized system comprising a computer, image processing means and display means and configured to provide images and measurements 2-5 centimeters ahead inside a patient's arteries occlusions therein purposing to move and navigate safely into the right artery lumen; first steering means connected with said guide wire head and configured to navigate and direct said laser-acoustic head sensor according to said image processing results; and a second guide wire comprising a second guide wire head and opening means connected with said second guide wire head for opening total occlusion of said artery, wherein said first and second guide wires are configured to be inserted into a patient's blood vessel on opposite sides of an occlusion.

BRIEF DESCRIPTION OF THE DRAWINGS

For better understanding of the invention and to show how the same may be carried into effect, reference will now be made, purely by way of example, to the accompanying drawings.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings:

FIGS. 6A-6C schematically illustrates exemplary occlusion opening tools used in the device according to the present invention;

DETAILED DESCRIPTION OF SOME EMBODIMENTS

The present invention provides systems and methods for blood vessels scanning and cleaning, such as a coronary artery, peripheral artery, or any other body vascular, based on a mobile agent. The system consists of a micro-mechanic guide-wire (catheter) device which is electronically controlled, performing a procedure of vessel walls cleaning by removing the accumulated plaque or any total occlusion material. This plaque or other blockage type may cause atherosclerosis and can eventually cause the artery to be blocked, causing heart disease, heart attack or stroke. Upon initial setup the system is inserted into a human body and guided within its blood vessels. Based on laser-acoustic sensors wire-or-wirelessly communicating with an imaging system, the system finds clogged areas and removes the blockage, without damaging the vessel's tissue, using its cleaning system. The guide wire travels and searches for blockages within blood vessels using a full imaging, navigation (steering) and cleaning system.

The system also includes a mechanism to remove and collect the removed plaque or any other blockage material. This system performs safe and efficient blood vessels cleaning and provides an innovative non surgical method for blood vessels blockage removal. The systems and the methods enable safe moving into total occlusion in any artery and mainly at coronary by using innovative safe navigation into the lumen, special steering and debris cleaning and removal technologies.

The system includes integration of a number of methods of efficient mechanical steering, efficient micro mechanic tools to clean the occluded artery while penetrating safely in the right lumen, continuous 3D imaging of 2-5 centimeters ahead, distinguishing between materials and measurable information about the distance of the laser-acoustic sensor head from the walls.

It is understood that in order to allow for the various tools (catheters) to arrive at the location of the problem, and to operate during the activated vision, they have to reach the spot at the same time.

The various tools have to be integrated in an area contained within a circle of diameter 1-3 mm.

Figures 1A, 1B:
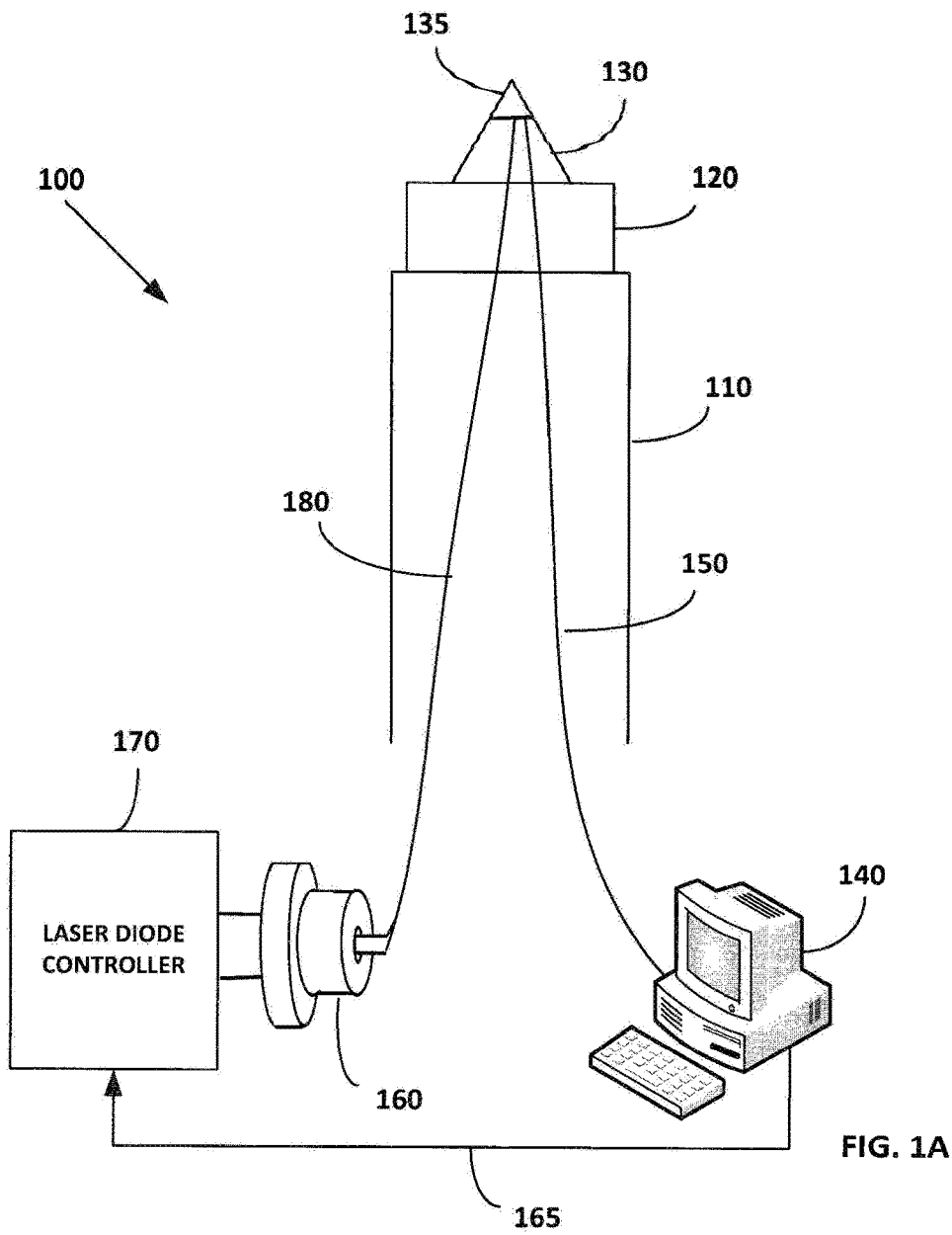
FIGS. 1A-1B schematically illustrate the system according to embodiments of the present invention.

FIG. 1A schematically illustrates the system according to embodiments of the present invention.

The system 100 comprises a guide wire, having a guide wire tube-shaped body 110, a guide wire head 120, a guide wire tip 130 including a laser-acoustic sensor 135.

A laser diode 160 controlled by controller 170 is connected via an optical fiber 180 with the laser-acoustic sensor 135 and provides laser pulses thereto. The connection may be wired or wireless. The frequency of the laser pulses is determined by the laser diode controller 170 and may be changed during operation by the computer 140 program or manually, according study of conditions (e.g. density of identified materials).

A computer 140 comprising image processing means is connected via electronic cable 150 to the laser-acoustic sensor 135 and continuously receives laser and ultrasound signals therefrom. The signals are processed by an image processing means, as described in detail below. The computer 140 may communicate 165 with the laser diode controller 170.

FIG. 1B is a schematic top view of the guide wire device, showing the guide wire head 120, the laser-acoustic sensor 135 and holes (exits) 190 configured to hold the laser acoustic sensor and various cutting and drilling and debris collecting tools, as described in detail below.

A number of efficient methods may be implemented for steering the guide wire inside the blood vessels, like using very thin super elastic (e.g. 0.1 mm or less) wires to change direction. Other methods may include, for example, using a pneumatic or hydraulic micro actuator, as will be explained in detail below.

Figure 2:
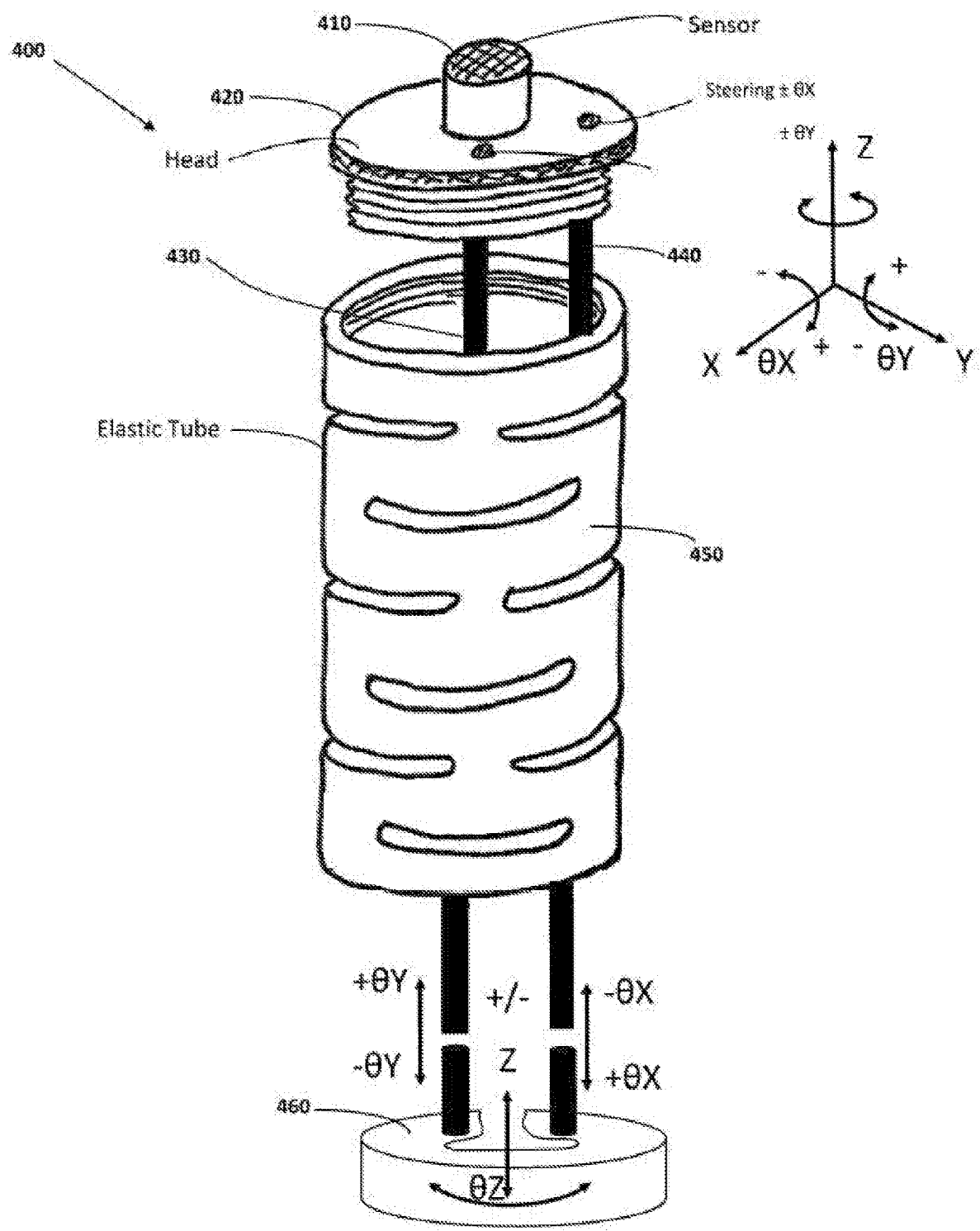
FIG. 2 schematically illustrates exemplary steering means of the guide wire device according to embodiments of the present invention.

FIG. 2 schematically illustrates exemplary steering means of the guide wire device, comprising two super elastic thin wires or push/pull rods made for example of nickel-titanium (430, 440) that are connected to the head 420 of the guide wire. The wires 420, 430 are threaded through a guide tube 450 and may be connected on their other side to a handle 460. Pulling one or both of the wires from outside of the body (optionally by bending the handle) will change the direction of the guide wire head in the requested direction. The handle 460 may also be rotated in any direction, for example for guiding a certain drilling or cutting tool to the required place.

Figure 3:
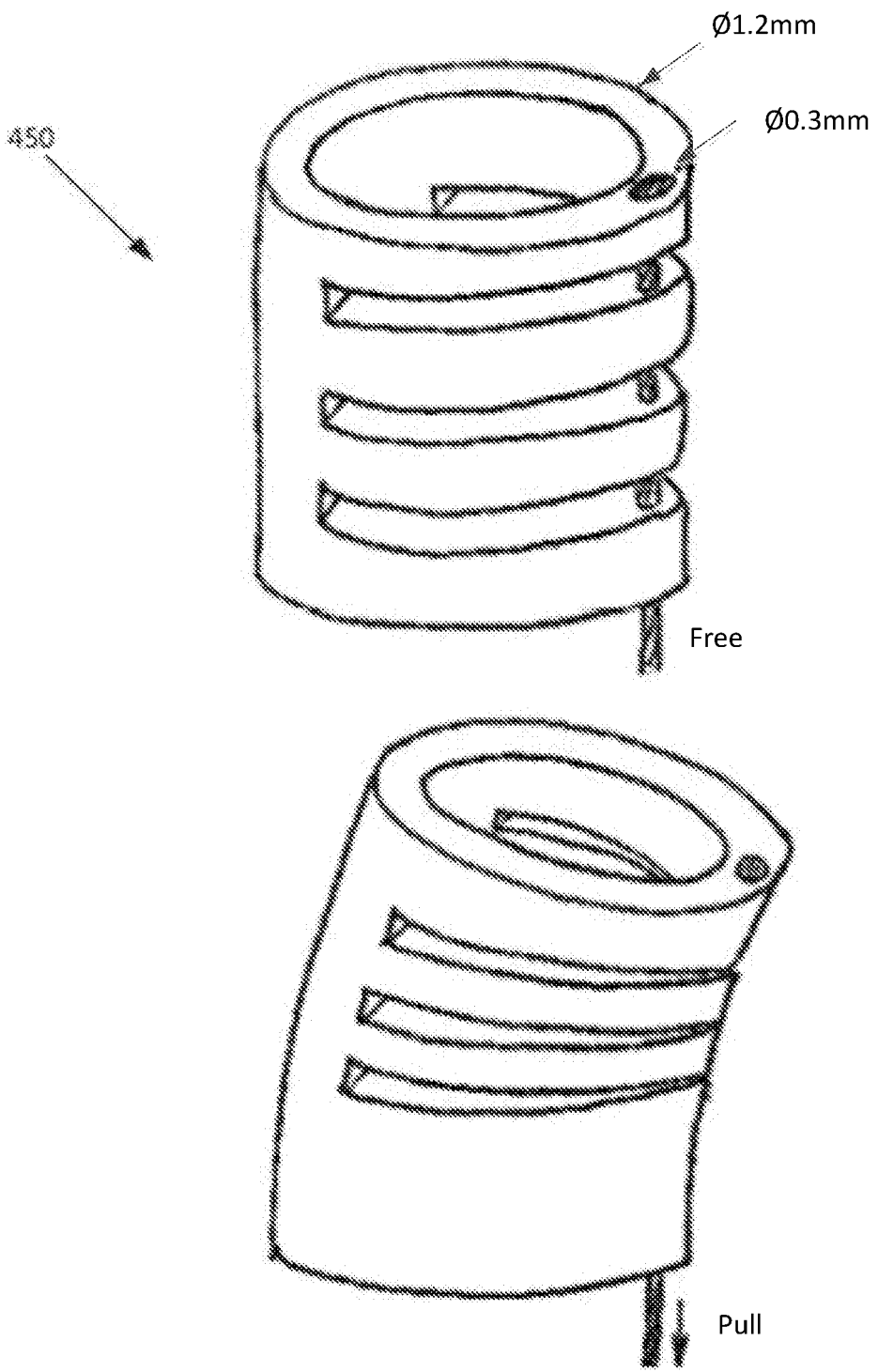
FIG. 3 schematically illustrates an exemplary elastic structure of the guide tube according to embodiments of the present invention.

FIG. 3 schematically illustrates an exemplary elastic structure of the guide tube 450 of FIG. 2, according to embodiments of the present invention. A thin super elastic wire is threaded through a wall of the guide tube spanning the length of the tube. Pulling the wire causes the tube to bend in the direction of the pulled wire. A second wire may be threaded on the opposite wall for enabling the tube to bend in the opposite direction. The tube may be made of any suitable elastic material such as plastic or nickel-titanium.

Figure 4:
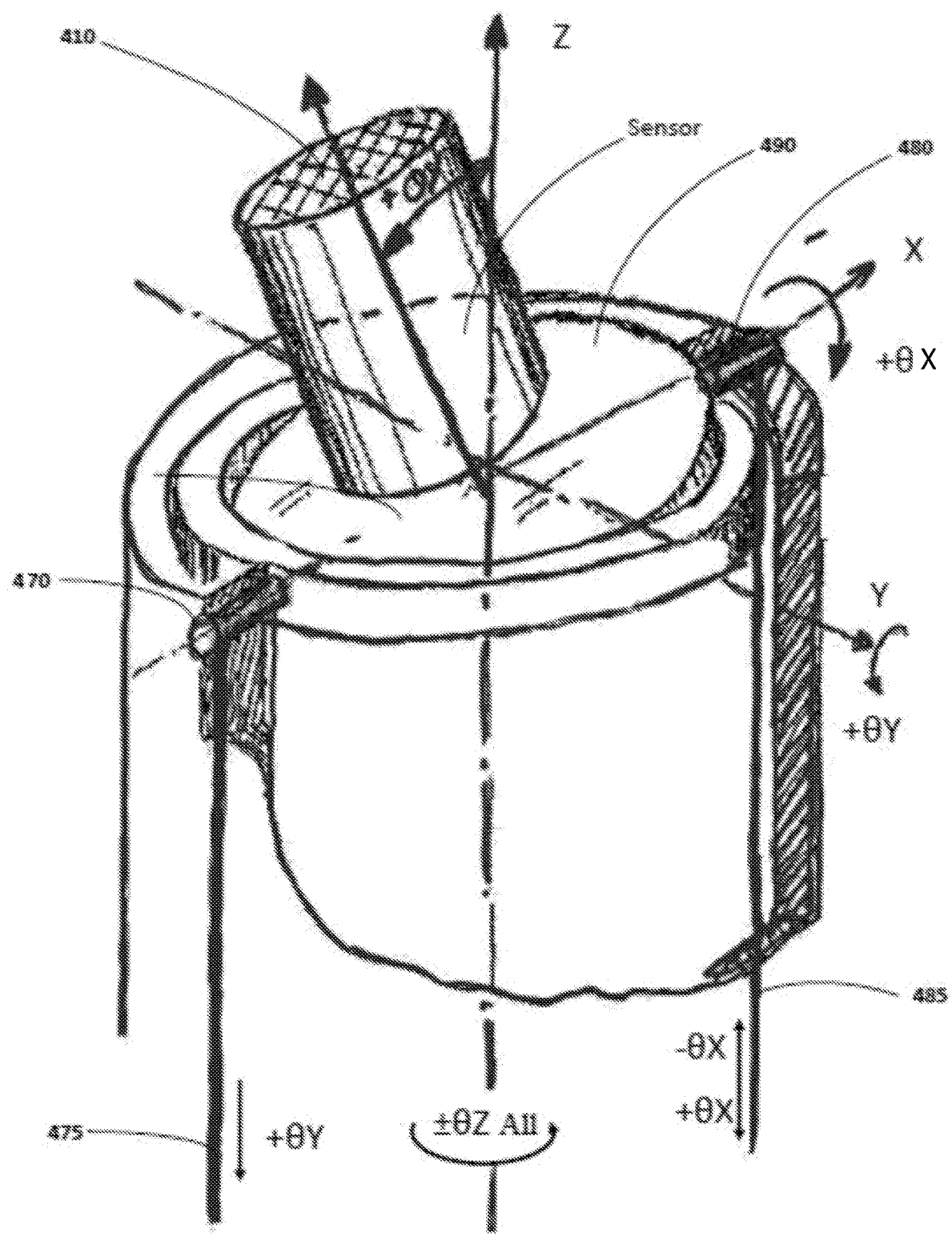
FIG. 4 schematically illustrates other exemplary steering means of the guide wire device according to embodiments of the present invention.

FIG. 4 schematically illustrates other exemplary steering means of the guide wire device according to embodiments of the present invention.

Tiny arms 470, 480 are connected on two sides of a swiveling guide wire head 490. The arms are maneuvered by two thin super elastic wires 475, 485 connected thereto respectively, going outside of the body. Pulling the wires will change the guide wire head's inclination and thus change the sensor's direction in the requested degree, enabling control of the direction and the steering of the guide wire tip or the sensor.

In an alternative embodiment, a pneumatic or hydraulic micro actuator may be used for steering the guide wire. Hydraulic catheters share the advantage of having no interference with the scanner, as they are driven by fluid pressure in tubes on the sides of the catheter. Increasing pressure bends the catheter away from the pressurized tube. A pneumatic or hydraulic catheter design in which tubing runs on either side of a catheter to an elastomeric cylindrical catheter tip in which one or more steering lumens are offset from the longitudinal axis of the catheter. In a design such as this, catheter direction could be elicited by using a pneumatic or hydraulic pressure source or by heating a thermally expandable material filling the steering lumens.

Figure 5:
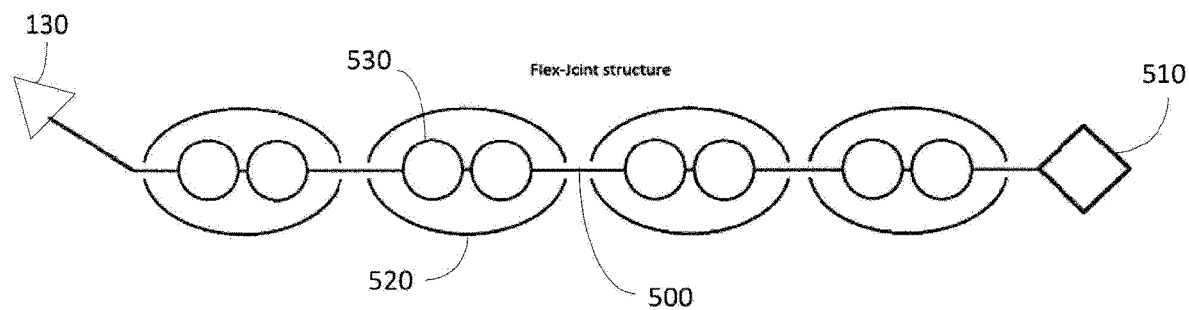
FIG. 5 schematically illustrates other exemplary steering means of the guide wire device according to embodiments of the present invention.

FIG. 5 schematically illustrates other exemplary steering means of the guide wire device according to embodiments of the present invention, comprising an elastic guide wire 500 connected on one end thereof to an external control knob 510, using flexible joints 520 comprising metal balls 530, that allow a drive shaft to transmit power through a variable angle, at constant rotational speed. The other end of the elastic guide wire 500 is connected to the tip of the guide wire head. Pushing the elastic guide wire via the knob will change the direction of the head device to the right lumen or the right direction as the surgeon wants as any given moment.

FIGS. 6A-6C schematically illustrates exemplary micro mechanical wire tools occlusion opening tools used in the device according to the present invention.

Penetrating the frequently fibrotic and focally calcified substance of the occlusion may be done through the use of either mechanical stiffness or an alternative energy modality (laser, radiofrequency, ultrasound, blunt micro dissection).

Each of the micro mechanical wire tools must provide: x and y motion, tilting, advancing and retreating, and activating the cutting or drilling motion.

On top of a guide wire which reaches the total osculation spot, a 1-3 mm guide tube is driven to the spot.

In the guide tube there is sufficient space for entering 2 or 3 devices/tools.

The micro-mechanic methods to open the total occlusion include drilling, rotation, cutting and similar method that open and clean the Occlusion safely.

Micro-mechanic cutting means may comprise, for example, a drill. Other cutters or grippers are optional. With a laser-acoustic sensor in operation, two more tools can be inserted, such as a cutter and a debris collector The tool of FIG. 6A comprises a round pin file 600 encased in a safety cover 610, mounted on a rod (or thin wire) 620 and inserted through one of the guide tube's openings 630. The file is operated by pushing the rod 620 forward (in the (+) direction) and may be rotated, as shown by arrow 640. The operation allows for rotating and stroking (+)/(−).

Alternatively, the drilling tool may be a Burin grinder which can be inserted in the cover, thus allowing to limit the depth of cut in order to increase safety.

The tool of FIG. 6B shows an alternative drilling tool.

The tool of FIG. 6C shows a vice or gripping tool.

Another opening option, starting from the occlusion cap is safe melting by using low power laser-acoustic (to prevent over heating).

Figure 7:
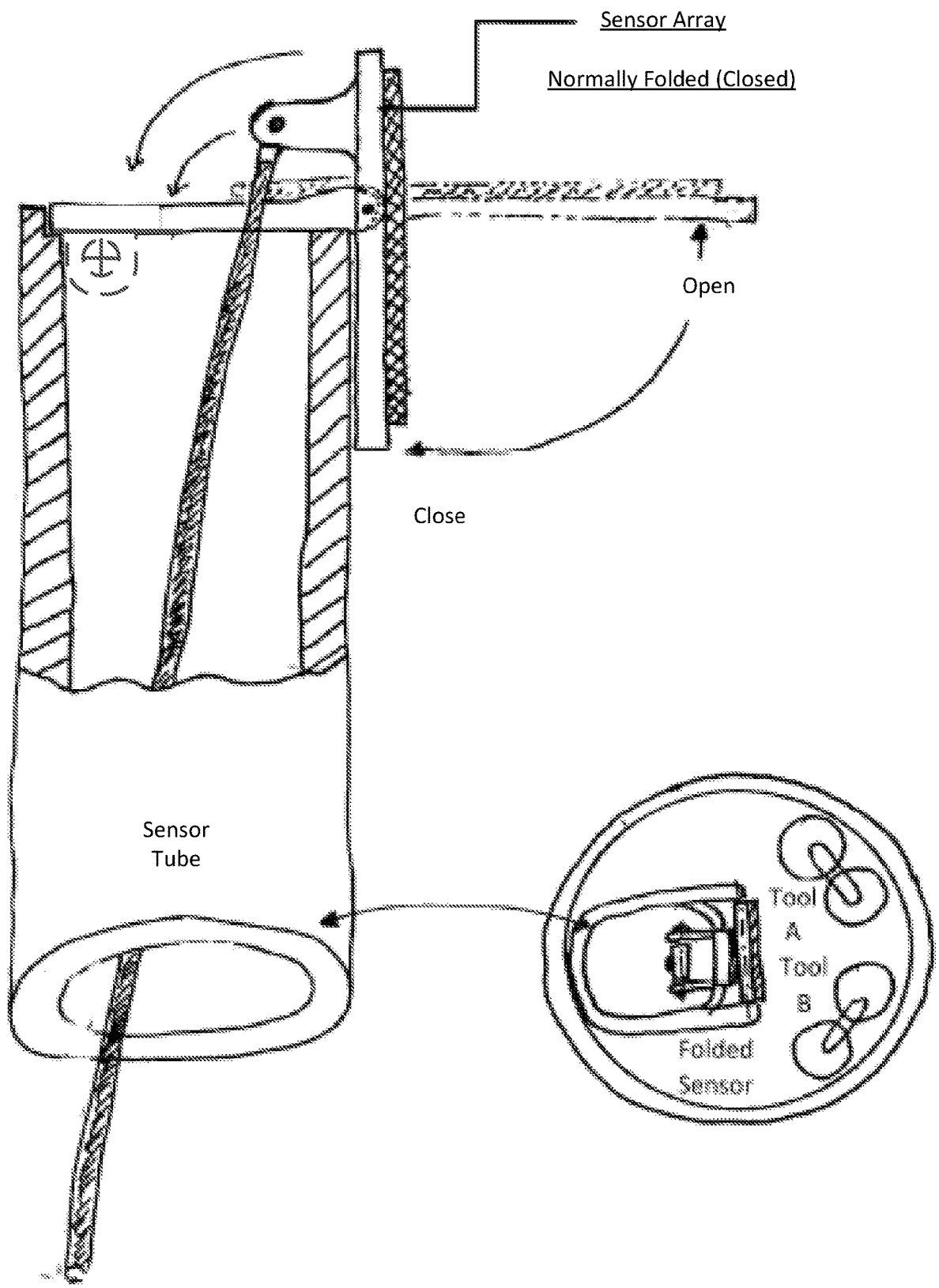
FIG. 7 schematically illustrates an exemplary method of placing the laser-acoustic sensor into the blockage according to embodiments of the present invention.

FIG. 7 schematically illustrates an exemplary method of placing a laser-acoustic array sensor into the blockage according to embodiments of the present invention.

The method is aimed at reducing the profile of an array laser-acoustic sensor to enable vascular penetration. As can be seen, the sensor array is inserted into the guide tube in a folded position and is then unfolded using a thin super elastic wire for operation.

The guide tube, the laser-acoustic sensor and the various cutting and drilling tools may be built using MicroElectro-Mechanical Systems (MEMS) technology, to provide for the required miniaturization. The ability to visualize into the occluded few centimeters ahead and to navigate into the right lumen of the artery provides safety in the opening and cleaning of total occlusion. The method comprises short pulsed laser induced single plane acoustic wave generation, propagation and interaction with rigid and/or soft structures. Operation of such systems within liquid are carefully studied due to their great contribution to the medical field. One of the most effective implementation of Laser Acoustics technology is distance measurements within vascular objects, such as distance from the vessel's wall. Vital information within the ranges of microns and nanometer can be accurately obtained.

A large area, short duration, single plane acoustic wave is generated by the thermo elastic interaction of homogenized nanosecond pulsed laser beam on the top of the sensor with a liquid-solid interface. Laser flash image processing is used to visualize the transient interaction of the plane acoustic wave with various submerged rigid/soft structures. Analyzing the transient interaction of the acoustic wave enables accurate measurement of small distances in the area of microns and nanometer and provides vision ahead into the occlusion.

Laser ultrasonic techniques, using nanosecond pulses for thermo-elastic generation have been widely proven as a versatile tool for measuring acoustic wave motion at surfaces up to very high frequencies (GHz-THz). A computer program assembles the material image within a single grain and the properties of dislocations and grain boundaries, determine the measurements over all planar directions that need to be made in order to see all the waves scattered or directed in off-axis directions. An imaging technique greatly speeds up the measurement process and could identify depth and length quickly. Furthermore the method of imaging enables the measurements of the material granularity, based on the UHF probing, to determine thickness of a number of materials within the probed object. An exemplary application can be blockage identification within a curved pipe. This type of blockage is easily determined during the processing of the entire image of a material through a dynamic hologram. The process performs optical excitation and transport of charge carriers within select nonlinear optical materials and produces a diffraction grating or hologram from the interference pattern developed inside the material.

Energy may be saved by using pre-panning of the laser acoustic pulse rates.

The maneuverable laser-acoustic system is driven all the way to the spot, which allows the experts to plan for the following tasks: selecting tools, determining position to cut or drill, and estimating the length and thickness of the occlusion.

Figure 8:
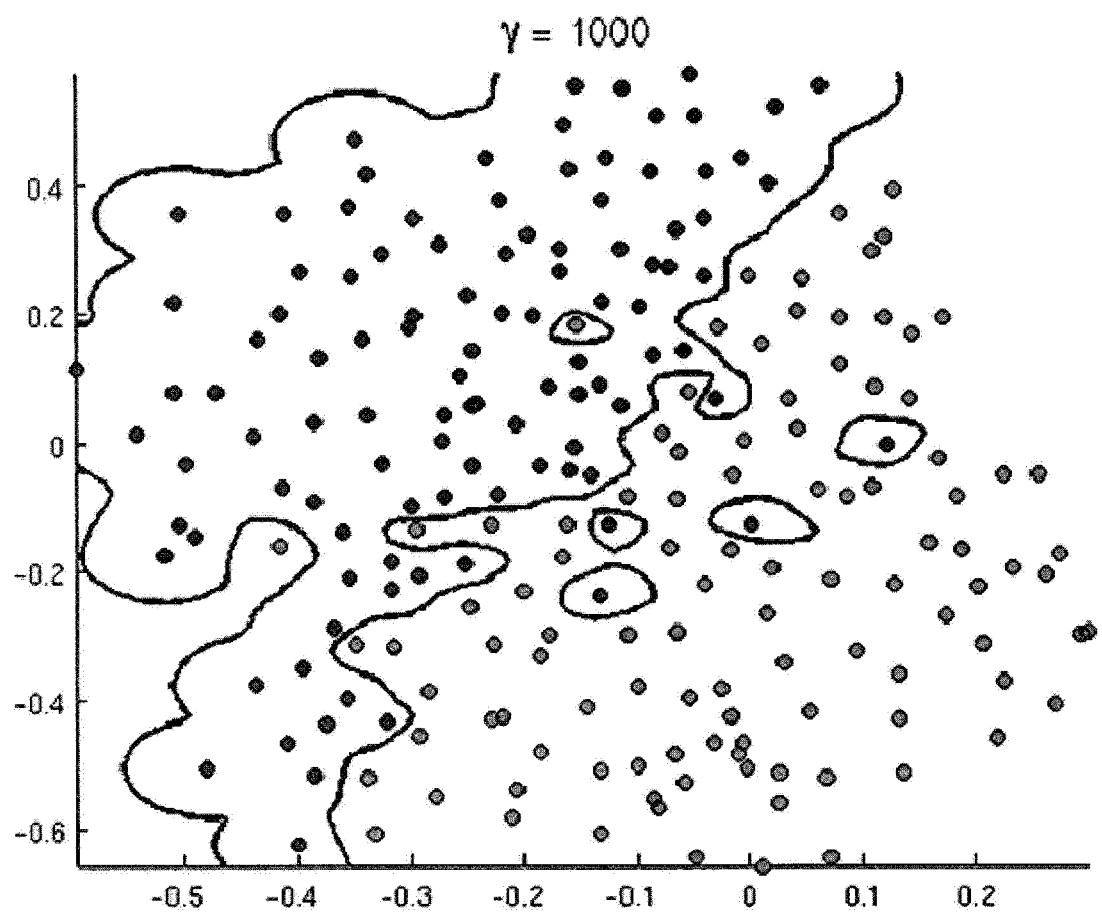
FIG. 8 shows a 3D image representing different material densities detected by a pattern recognition system according to embodiments of the present invention.

FIG. 8 shows a 3D image representing different material densities detected by a pattern recognition system using frequency deflection and acoustic distribution, according to embodiments of the present invention. The differentiated materials include artery's walls, blood, and clog materials.

Figure 9:
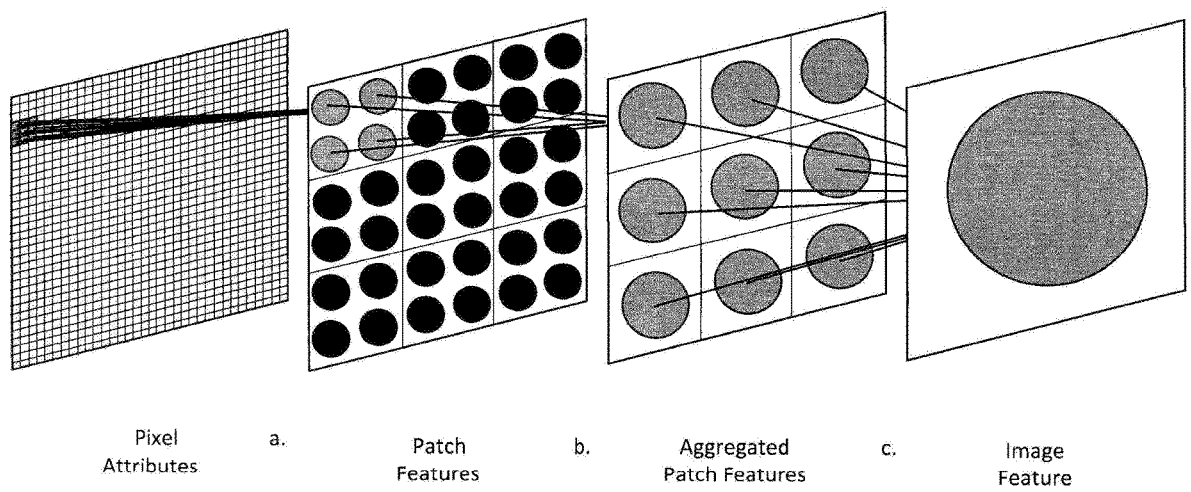
FIG. 9 schematically shows aggregation of pixels of an area of interest for identifying different materials according to embodiments of the present invention.

FIG. 9 shows aggregation of pixels of an area of interest for identifying different materials according to embodiments of the present invention:
 a. Neighboring pixels having similar attributes are aggregated into patches.
 b. Neighboring patches having similar features are aggregated into patch features.
 c. A map of the various image features (regions) is created.

The system thus enables distinguishing a true luminal path (dissection) from one created through the vessel wall (perforation) of the occluded segment, including imaging ahead and on sides of the walls.

Figure 10:
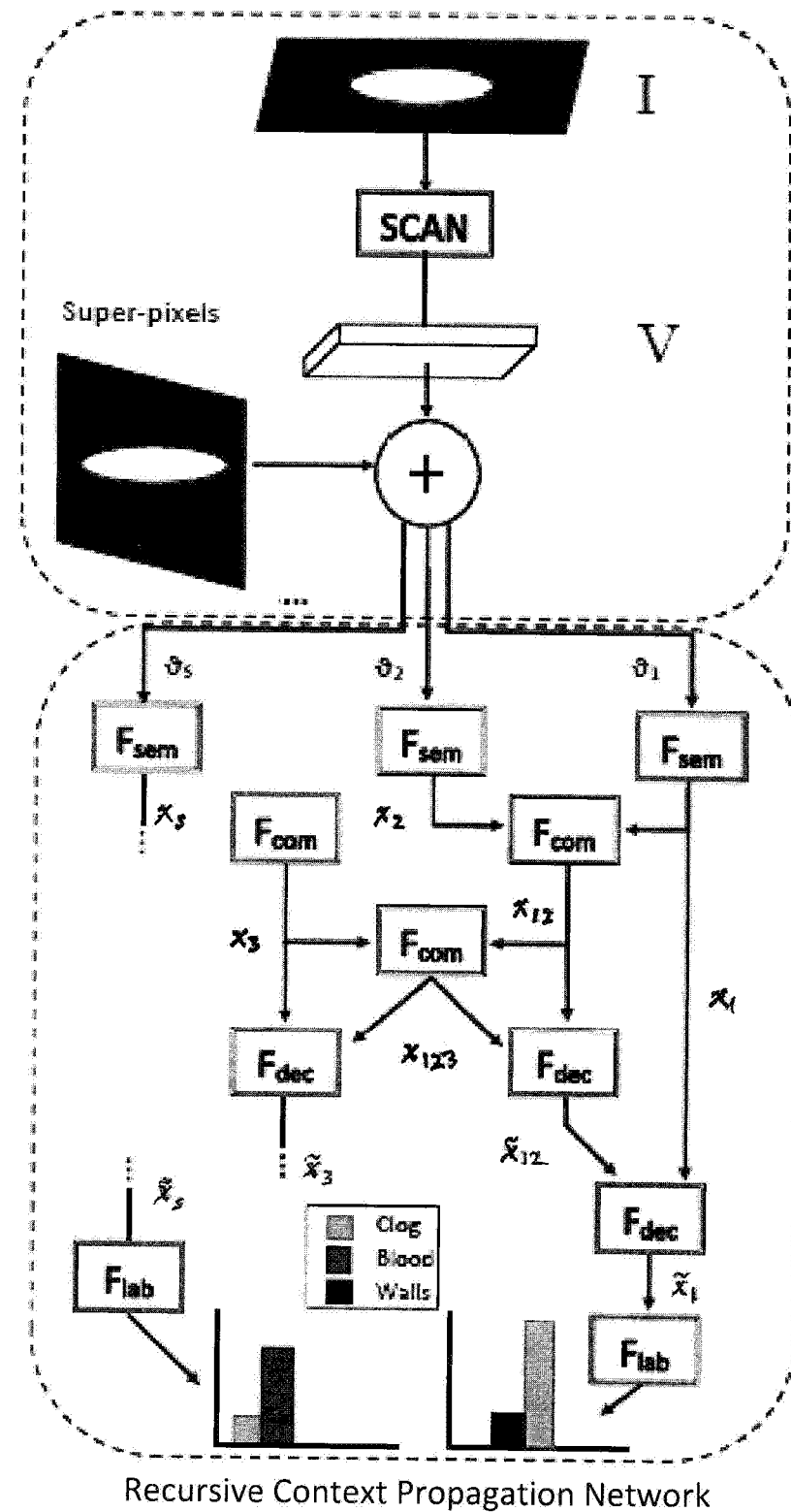
FIG. 10 schematically shows a neural networks architecture for material identification according to embodiments of the present invention.

FIG. 10 schematically shows a neural networks architecture for material identification according to embodiments of the present invention. The system includes a deep feed-forward neural network architecture for pixel-wise semantic interveners material identification. It uses a novel recursive neural network architecture for context propagation. It first maps the image features into a semantic space followed by a bottom-up aggregation of local information into a global representation of the entire image. Then a top-down propagation of the aggregated information takes place that enhances the contextual information of each local feature. Therefore, the information from every location in the image is propagated to every other location. Experimental results show that the proposed method proved to be efficient and fast. It takes only 0.07 seconds on a GPU (Graphical Processing Unit) for pixel-wise, building a 256×256 image starting from raw RGB pixel values, given the super-pixel mask that takes an additional 0.3 seconds using an off-the-shelf implementation.

According to embodiments of the invention the functions of laser-acoustic imaging and occlusion opening may be divided between two catheters working in tandem.

The first catheter is similar to the one described in FIG. 1A and comprises a guide wire, having a guide wire tube-shaped body 110, a guide wire head 120, a guide wire tip 130 including a laser-acoustic sensor 135.

A laser diode 160 controlled by controller 170 is connected via an optical fiber 180 with the laser-acoustic sensor 135 and provides laser pulses thereto. The connection may be wired or wireless. The frequency of the laser pulses is determined by the laser diode controller 170 and may be changed during operation by the computer 140 program or manually, according study of conditions (e.g. density of identified materials).

A computer 140 comprising image processing means is connected via electronic cable 150 to the laser-acoustic sensor 135 and continuously receives signals therefrom. The signals are processed by an image processing means, as described in detail below. The computer 140 may communicate 165 with the laser diode controller 170.

The second catheter according to these embodiments is inserted into the patient's blood vessel after an occlusion has been identified by the imaging system, from the opposite side of the occlusion. The second catheter is used for inserting opening/cleaning tools as described in conjunction with FIGS. 6A-6C, which are navigated using any one of the navigation methods described above and in conjunction with FIGS. 2-5. The second catheter is navigated by a user according to the imaging ahead results of the image processing system displayed on the user's computer 140.

The invention claimed is:
1. A vascular guide wire device comprising:
 a guide wire comprising a guide wire head and a laser-acoustic head sensor positioned at the guide wire's distal end configured to navigate in a patient's artery, the guide wire configured to advance in the patient's artery in the direction the patient's artery extends, said laser-acoustic head sensor connected via an optic fiber threaded through said guide wire device with a laser diode controlled by a laser diode controller and configured to send laser pulses inside said patient's artery, in the direction the patient's artery extends, and into total occlusions of the patient's artery and receive reflected acoustic signals to be converted into images;
 a computerized system electronically communicating with said laser-acoustic head sensor, said computerized system comprising a computer, image processing means and a display;
 wherein said computerized system is configured to provide images and measurements 2-5 centimeters into total occlusions in said patient's artery on said display, using said reflected acoustic signals and image processing, thereby enabling to move and navigate safely into the correct artery lumen;
 first steering means connected with said guide wire head and configured to navigate said laser-acoustic head sensor according to said image processing results; and
 opening means connected with said guide wire head for opening total occlusion of said artery.

2. The vascular guide wire device of claim 1, wherein said connection of said optic fiber with said laser diode is wireless.

3. The vascular guide wire device of claim 1, wherein said first steering means comprise means for changing direction of said laser acoustic head sensor to correct deviations from the desired path through the total occlusion.

4. The vascular guide wire device of claim 1, wherein said first steering means comprise one of:
- two super elastic thin wires that are connected to the laser-acoustic head sensor, said thin wires configured to change the direction of the guide wire head upon being pulled from outside of the patient's body; wherein said guide wire head is configured to swivel and wherein said first steering means comprise tiny arms connected to said swiveling head, each one of said tiny arms connected to a respective one of said super elastic thin wires;
- an elastic guide wire connected on a first end thereof to an external control knob and on a second end thereof to the guide wire head; and flexible joints comprising metal balls spanning said elastic guide wire;
- a pneumatic micro actuator; and
- an hydraulic micro actuator.

5. The vascular guide wire device of claim 1, wherein said opening means comprise one of: at least one micro-mechanical tool navigated by second steering means; low power laser-acoustic configured to melt an occlusion cap; radiofrequency; ultrasound; and blunt micro dissection.

6. The vascular guide wire device of claim 1, wherein said imaging system is configured to distinguish a true luminal path from one created through the artery wall of an occluded segment, including imaging ahead and on sides of the walls; and differentiate between material types.

7. The vascular guide wire device of claim 1, wherein said imaging system is configured to provide continuous measurement information about the laser-acoustic head sensor's distances from the artery wall.

8. The vascular guide wire device of claim 1, wherein said image processing means comprise 3-dimensional image processing means comprising means for automated and continuous measurement of the guide wire head distance from the artery's wall.

9. The vascular guide wire device of claim 1, further comprising energy management means configured to provide pre-panning of the laser acoustic pulse rates.

10. The vascular guide wire device of claim 1, wherein said computer is electronically connected with said laser diode controller.

11. The vascular guide wire device of claim 1, wherein said computer controls the frequency of said laser diode pulses according to a measured guide wire head distance from the artery's wall.

* * * * *